United States Patent
Ha et al.

(10) Patent No.: US 12,319,266 B2
(45) Date of Patent: Jun. 3, 2025

(54) DEVICE FOR CONTROLLING HYBRID VEHICLE AND METHOD THEREOF

(71) Applicants: Hyundai Motor Company, Seoul (KR); Kia Corporation, Seoul (KR)

(72) Inventors: Seung Woo Ha, Seoul (KR); Jung Hwan Bang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 272 days.

(21) Appl. No.: 17/862,742

(22) Filed: Jul. 12, 2022

(65) Prior Publication Data

US 2023/0219553 A1 Jul. 13, 2023

(30) Foreign Application Priority Data

Jan. 10, 2022 (KR) .................. 10-2022-0003394

(51) Int. Cl.
*B60W 20/11* (2016.01)
*B60W 40/105* (2012.01)
*B60W 50/00* (2006.01)

(52) U.S. Cl.
CPC .......... *B60W 20/11* (2016.01); *B60W 40/105* (2013.01); *B60W 50/0097* (2013.01); *B60W 2510/182* (2013.01); *B60W 2520/10* (2013.01); *B60W 2552/15* (2020.02)

(58) Field of Classification Search
CPC ............. B60W 20/11; B60W 50/0097; B60W 40/105; B60W 20/10; B60W 40/09; B60W 2050/0075; B60W 2552/15; B60W 2520/10; B60W 2510/182; B60W 2050/0088; B60W 2556/10; B60W 2556/55; B60K 6/48; B60K 2006/4816; B60K 2006/4825
See application file for complete search history.

(56) References Cited

U.S. PATENT DOCUMENTS

| 7,240,750 | B2 | 7/2007 | Patel |
| 9,090,255 | B2 | 7/2015 | Gupta et al. |
| 2018/0281775 | A1* | 10/2018 | Lee ........................ B60W 20/12 |
| 2022/0219691 | A1* | 7/2022 | Maleki ................... G06F 11/079 |

FOREIGN PATENT DOCUMENTS

| JP | 5059246 B2 | 10/2012 |
| JP | 6741131 B1 | 8/2020 |
| KR | 10-1943864 B1 | 1/2019 |
| KR | 10-2019-0098785 A | 8/2019 |

OTHER PUBLICATIONS

Rabinowitz et al., Development and Evaluation of Velocity Predictive Optimal Energy Management Strategies in Intelligent and Connected Hybrid Electric Vehicles, Sep. 10, 2021, pp. 1-21 (Year: 2021).*

* cited by examiner

*Primary Examiner* — Anne Marie Antonucci
*Assistant Examiner* — Jared C Bean
(74) *Attorney, Agent, or Firm* — Fox Rothschild LLP

(57) ABSTRACT

Disclosed are a device for controlling a hybrid vehicle and a method thereof. The device includes a communication device that receives a plurality of data sets including a driving pattern and a control coefficient, and a controller that extracts speeds from the driving pattern, learns a control coefficient prediction model by using an average and a standard deviation of the speeds, and determines a control coefficient of the hybrid vehicle based on the control coefficient prediction model for which the learning is completed.

8 Claims, 11 Drawing Sheets

| t | 0 | 30 | 60 | 90 | 120 | 150 | 180 | 210 | 240 | 270 | 300 | 330 | |
|---|---|----|----|----|-----|-----|-----|-----|-----|-----|-----|-----|---|
| 1 | co-state1 | | | | 2.0 | 2.0 | 2.0 | 2.0 | 2.0 | 2.0 | 2.0 | | |
| 2 | | co-state2 | | | | 2.1 | 2.1 | 2.1 | 2.1 | 2.1 | 2.1 | 2.1 | |
| 3 | | | co-state3 | | | | 2.2 | 2.2 | 2.2 | 2.2 | 2.2 | 2.2 | 2.2 |
| 4 | | | | co-state4 | | | | 2.5 | 2.5 | 2.5 | 2.5 | 2.5 | 2.5 |
| 5 | | | | | co-state4 | | | | 2.8 | 2.8 | 2.8 | 2.8 | 2.8 |
| 6 | | | | | | co-state5 | | | | 2.8 | 2.8 | 2.8 | 2.8 |
| 7 | | | | | | | co-state6 | | | | 2.7 | 2.7 | 2.7 |
| 8 | | | | | | | | co-state7 | | | | 2.9 | 2.9 |
| ... | | | | | | | | | | | | | |

| t | 0 | 30 | 60 | 90 | 120 | 150 | 180 | 210 | 240 | 270 | 300 |
|---|---|----|----|----|-----|-----|-----|-----|-----|-----|-----|
| 1 | DATA COLLECTION | | | | 2.0 | 2.0 | 2.0 | 2.0 | 2.0 | 2.0 | 2.0 |

Fig.6

| t | 0 | 30 | 60 | 90 | 120 | 150 | 180 | 210 | 240 | 270 | 300 | 330 | |
|---|---|----|----|----|-----|-----|-----|-----|-----|-----|-----|-----|---|
| 1 | co-state1 | | | | 2.0 | 2.0 | 2.0 | 2.0 | 2.0 | 2.0 | 2.0 | | |
| 2 | | co-state2 | | | | 2.1 | 2.1 | 2.1 | 2.1 | 2.1 | 2.1 | 2.1 | |
| 3 | | | co-state3 | | | | 2.2 | 2.2 | 2.2 | 2.2 | 2.2 | 2.2 | 2.2 |
| 4 | | | | co-state4 | | | | 2.5 | 2.5 | 2.5 | 2.5 | 2.5 | 2.5 |
| 5 | | | | | co-state4 | | | | 2.8 | 2.8 | 2.8 | 2.8 | 2.8 |
| 6 | | | | | | co-state5 | | | | 2.8 | 2.8 | 2.8 | 2.8 |
| 7 | | | | | | | co-state6 | | | | 2.7 | 2.7 | 2.7 |
| 8 | | | | | | | | co-state7 | | | | 2.9 | 2.9 |
| ... | | | | | | | | | | | | | |

Fig.7

| co-state | ... | 2.0 | 2.1 | 2.2 | 2.5 | 2.8 | 2.8 | 2.7 | 2.9 | ... |
|---|---|---|---|---|---|---|---|---|---|---|
| EXPONENTIAL MOVING AVERAGE | ... | 2.0 | 2.07 | 2.161 | 2.39 | 2.67 | 2.76 | 2.71 | 2.84 | ... |
| MOVING AVERAGE | ... | 2.0 | 2.05 | 2.1 | 2.2 | 2.32 | 2.4 | 2.44 | 2.57 | ... |

Fig.8

DEVICE FOR CONTROLLING HYBRID VEHICLE AND METHOD THEREOF

CROSS-REFERENCE TO RELATED APPLICATION

This application is based on and claims under 35 U.S.C. § 119(a) the benefit of Korean Patent Application No. 10-2022-0003394, filed in the Korean Intellectual Property Office on Jan. 10, 2022, the entire contents of which are incorporated herein by reference.

TECHNICAL FIELD

Embodiments of the present disclosure relate to a technology for determining a control coefficient of a hybrid vehicle based on a machine learning model.

DESCRIPTION OF RELATED ART

A hybrid electric vehicle is a vehicle in which the functions of a petroleum fueled vehicle and an electric vehicle are combined in order to solve problems such as exhaust gas problems in petroleum fueled vehicles that use only gasoline, diesel or gas, and shortening of battery usage time in electric vehicles that use only batteries.

Recently, the demand for an eco-friendly vehicle has increased in accordance with the demand for improvement of automobile fuel efficiency and the strengthening of emission regulations in each country, and a hybrid electric vehicle has attracted attention as a realistic alternative.

The hybrid electric vehicle includes a series hybrid electric vehicle (SHEV), a parallel hybrid electric vehicle (PHEV), and the like.

The parallel hybrid electric vehicle includes an engine that uses fossil fuels and a motor that assists engine output and uses electricity as power. The output of the motor may be adjusted according to a control value such as the strength of a supply voltage determined by the motor controller according to the driving (traveling) condition of the vehicle, and the power output by the motor is transmitted to the engine output shaft, thereby assisting the power output from the engine.

The output shaft of the motor is directly connected to the output shaft of the engine, specifically, one end of the crankshaft or is connected to transmit power through a belt or chain to assist the engine output, and the crankshaft output end opposite to the motor is provided to allow a transmission to intermittently receive power from the engine through a clutch, which shifts the engine power according to the driving situation and transmits it to the driving wheels.

Such a parallel hybrid electric vehicle may produce a high output while reducing the amount of engine exhaust gas and may significantly reduce harmful exhaust gas. In addition, the simple structure makes it easy to design and does not cost much, which is advantageous in securing price competitiveness. Meanwhile, it is complicated in terms of control because the ratio of engine output and motor output must be adjusted according to the driving situation.

A strategy in which a hybrid control unit (HCU) that controls a parallel hybrid electric vehicle determines the ratio of engine output and motor output is one of the most core and essential control strategies directly related to fuel efficiency. For reference, such a hybrid control unit must satisfy following Equation 1 in determining the ratio of engine output to motor output.

$$P_R = P_{EG} + P_B \quad \text{[Equation 1]}$$

Where $P_{EG}$ is the engine torque, $P_B$ is the motor torque, and $P_R$ is the required torque, respectively. For example, when the requested torque $P_R$ set by the accelerator pedal operation of a driver is '3' and the engine torque $P_{EG}$ determined according to the driving situation is '2', the motor torque $P_B$ is '1'.

In general, the hybrid controller determines the ratio of engine output to motor output based on an equivalent consumption minimization strategy (ECMS). That is, the hybrid control unit simply determines the ratio of engine output to motor output so that the state of charge (SOC) of the battery maintains a reference SOC (e.g., 60%) without considering the driving pattern of the vehicle.

Therefore, the conventional hybrid control unit cannot determine the ratio of engine output to motor output capable of minimizing the electrical energy consumption of the battery and fuel consumption in a rapidly changing driving environment.

The matters described in this background section are intended to promote an understanding of the background of the disclosure and may include matters that are not already known to those of ordinary skill in the art.

SUMMARY

Embodiments of the present disclosure have been made to solve the above-mentioned problems occurring in the prior art while advantages achieved by the prior art are maintained intact.

An embodiment of the present disclosure provides a device for controlling a hybrid vehicle and a method thereof which can minimize electrical energy consumption of the battery and fuel consumption in a rapidly changing driving environment by extracting speeds from a data set including a driving pattern and a control coefficient, learning a control coefficient prediction model by using an average and a standard deviation of the speeds and the control coefficient, and determining the control coefficient of the hybrid vehicle based on the control coefficient prediction model which the learning is completed.

The technical problems to be solved by embodiments of the present disclosure are not limited to the aforementioned problems, and any other technical problems not mentioned herein will be clearly understood from the following description by those skilled in the art to which embodiments of the present disclosure pertain.

According to an embodiment of the present disclosure, a device for controlling a hybrid vehicle includes a communication device that receives a plurality of data sets including a driving pattern and a control coefficient, and a controller that extracts speeds from the driving pattern, learns a control coefficient prediction model by using an average and a standard deviation of the speeds, and determines a control coefficient of the hybrid vehicle based on the control coefficient prediction model for which the learning is completed.

The controller may select a data set having an effective driving pattern from among the plurality of data sets.

The driving pattern may include a time series combination of driving states defined based on driving data.

The driving data may include at least one of a speed, a road slope, and a brake hydraulic pressure.

The controller may extract speeds from some initial driving states among driving states constituting the driving pattern of the hybrid vehicle and perform a control coefficient prediction process of inputting an average and a standard deviation of the speeds into the control coefficient prediction model.

The controller may predict a plurality of control coefficients by performing the control coefficient prediction process at a reference time period.

The controller may determine a recently predicted control coefficient among the plurality of control coefficients as an optimal control coefficient.

The controller may determine an optimal control coefficient by weighting a recently predicted control coefficient among the plurality of control coefficients.

The controller may determine an average of the plurality of control coefficients as an optimal control coefficient.

According to another embodiment of the present disclosure, a method of controlling a hybrid vehicle includes receiving, by a communication device, a plurality of data sets including a driving pattern and a control coefficient, extracting, by a controller, speeds from the driving pattern, learning, by the controller, a control coefficient prediction model by using an average and a standard deviation of the speeds, and determining a control coefficient of the hybrid vehicle based on the control coefficient prediction model for which the learning is completed.

The method may further include selecting, by the controller, a data set having an effective driving pattern from among the plurality of data sets.

The driving pattern may include a time series combination of driving states defined based on driving data.

The driving data may include at least one of a speed, a road slope, and a brake hydraulic pressure.

The determining of the control coefficient of the hybrid vehicle may include operation A of extracting speeds from some initial driving states among driving states constituting the driving pattern of the hybrid vehicle, and operation B of inputting an average and a standard deviation of the speeds into the control coefficient prediction model to predict a control coefficient.

The determining of the control coefficient of the hybrid vehicle may include predicting a plurality of control coefficients by performing the operation A and the operation B at a reference time period.

The determining of the control coefficient of the hybrid vehicle may include determining a recently predicted control coefficient among the plurality of control coefficients as an optimal control coefficient.

As discussed, the method and system suitably include use of a controller or processer.

In another embodiment, vehicles are provided that comprise an apparatus as disclosed herein.

BRIEF DESCRIPTION OF THE DRAWLNGS

The above and other objects, features and advantages of embodiments of the present disclosure will be more apparent from the following detailed description taken in conjunction with the accompanying drawings:

FIG. 6 is a view illustrating a scheme of applying a control coefficient by a controller provided in a device for controlling a hybrid vehicle according to an exemplary embodiment of the present disclosure;

FIG. 7 is a view illustrating a scheme of predicting a control coefficient by a controller provided in a device for controlling a hybrid vehicle according to an exemplary embodiment of the present disclosure;

FIG. 8 is a view illustrating a scheme of determining an optimal control coefficient by a controller provided in a device for controlling a hybrid vehicle according to an exemplary embodiment of the present disclosure;

DETAILED DESCRIPTION

Figure 1:
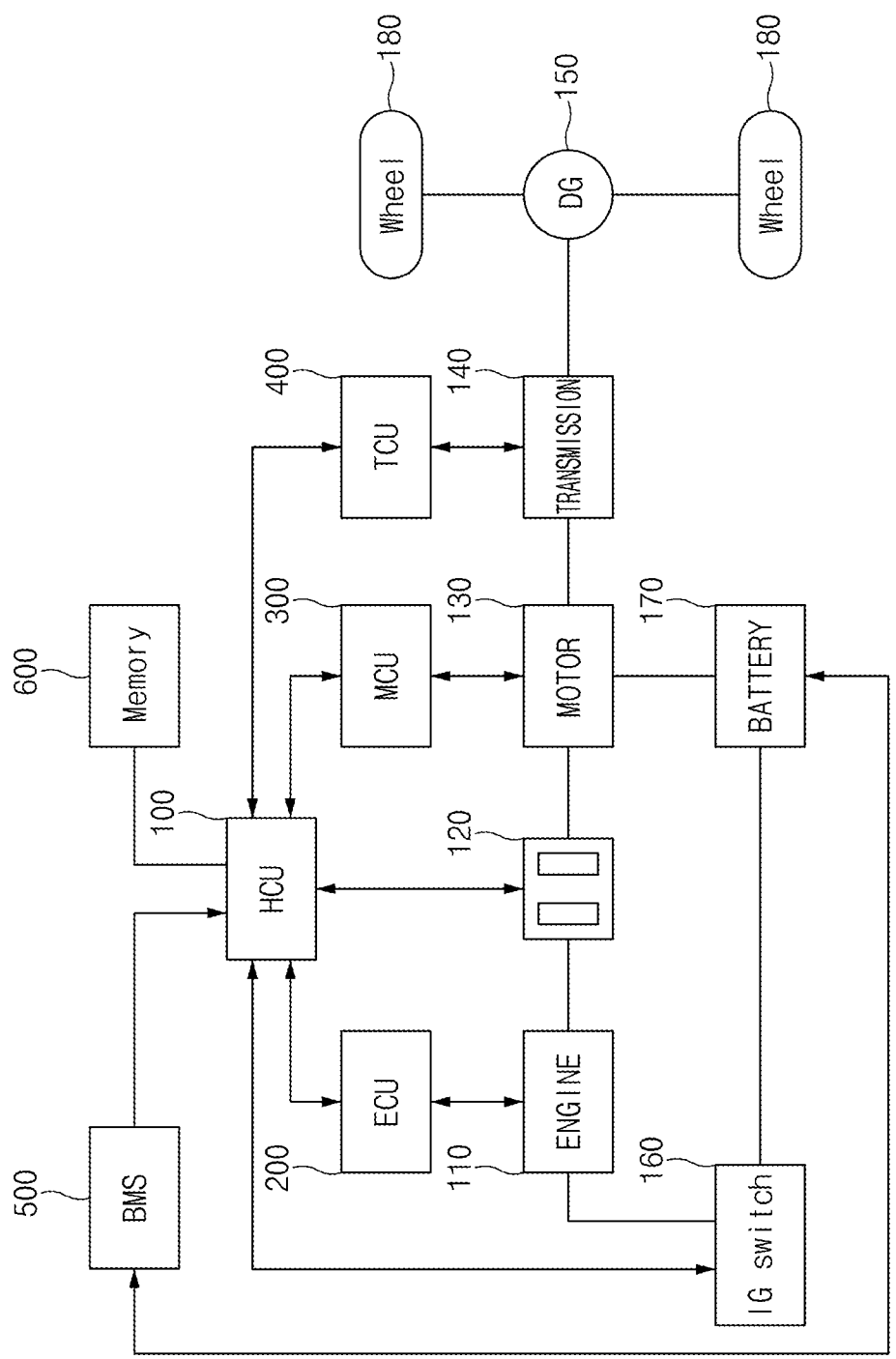
FIG. 1 is a block diagram illustrating an example of a hybrid vehicle to which an exemplary embodiment of the present disclosure is applied.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which embodiments of the present disclosure pertain. Such terms as those defined in a generally used dictionary are to be interpreted as having meanings equal to the contextual meanings in the relevant field of art and are not to be interpreted as having ideal or excessively formal meanings unless clearly defined as having such in the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean "About" can be understood as within 10%, 9%, 8%, 7%, 6%, 5%, 4%, 3%, 2%, 1%. 0.5%, 0.1%, 0.05%, or 0.01% of the stated value. Unless otherwise clear from the context, all numerical values provided herein are modified by the term "about".

FIG. 1 is a block diagram illustrating an example of a hybrid vehicle to which an exemplary embodiment of the present disclosure is applied.

As shown in FIG. 1, a hybrid vehicle to which an exemplary embodiment of the present disclosure is applied may include an engine 110, an engine clutch 120, a motor 130, a transmission 140, a differential gear 150, an ignition switch 160, a battery 170, and a wheel 180.

Examining each component, first, the engine clutch 120 may control power between the engine 110 and the motor 130, and the ignition switch 160 starts the engine 110 or the motor 130 through the battery 170 connected to the motor 130. The battery 170 may supply a voltage to the motor 130 in an EV driving mode.

In addition, the hybrid vehicle may include a hybrid control unit (HCU) 100, a non-volatile memory 600 connected to the HCU 100, an engine control unit (ECU) 200, a motor control unit (MCU) 300, a transmission control unit (TCU) 400, and a BMS 500.

The ECU 200 may control the overall operation of the engine 110. The MCU 300 may control the overall operation of the motor 130. The TCU 400 may control the overall operation of the transmission 140. That is, the ECU 200 controls the operation of the engine 110 according to a control signal applied from the HCU 100 through a network.

The MCU 300 may convert the DC voltage of the battery, 170 to a three-phase AC voltage according to a control signal provided to the network from the HCU 100 to control the output torque and speed of the motor 130 according to the required output.

In addition, the MCU 300 may crank the engine through the motor 130 to execute the engine start-on under the control of the HCU 100.

In addition, the MCU 300 may include an inverter including a plurality of power switching devices, and the power switching device may include one of an insulated gate bipolar transistor (IGBT), a MOSFET, and a transistor.

The BMS 500 may manage the state of charge (SOC) by detecting the current, voltage, temperature, and the like of each cell within an operating range of the battery 170 and provide all information about the battery 170 through the network to the HCU 100 to control the charge/discharge voltage of the battery 170, such that it is possible to prevent the battery 170 from being over-discharged below a limit voltage or overcharged above the limit voltage to shorten the lifespan.

The HCU 100, which is a high-level controller that controls the overall operation of the hybrid vehicle, may be connected to various controllers through a network to exchange information with each other. The HCU 100 may execute cooperative control to control the output torques of the engine 110 and the motor 130 and maintain driving by controlling the target gear ratio. In this case, the non-volatile memory 600 may be installed inside or outside the HCU 100, which is a memory device capable of erasing and re-inputting data while preserving the stored data even when the power is cut off. The non-volatile memory 600 may include a flash memory, an electrically erasable and programmable read only memory (EEPROM), and the like. In addition, the HCU 100 may calculate an engine speed (RPM), an engine torque, an ignition angle, and the like to give a command to the ECU 200.

Specifically, when an exemplary embodiment of the present disclosure is applied, the HCU 100 may minimize electrical energy consumption of the battery 170 and fuel consumption in a rapidly changing driving environment by extracting speeds from a data set including a driving pattern and a control coefficient, learning a control coefficient prediction model (machine learning model) by using an average and a standard deviation of the speeds and the control coefficient, and determining the control coefficient of the hybrid vehicle based on the control coefficient prediction model which the learning is completed.

Figure 2:
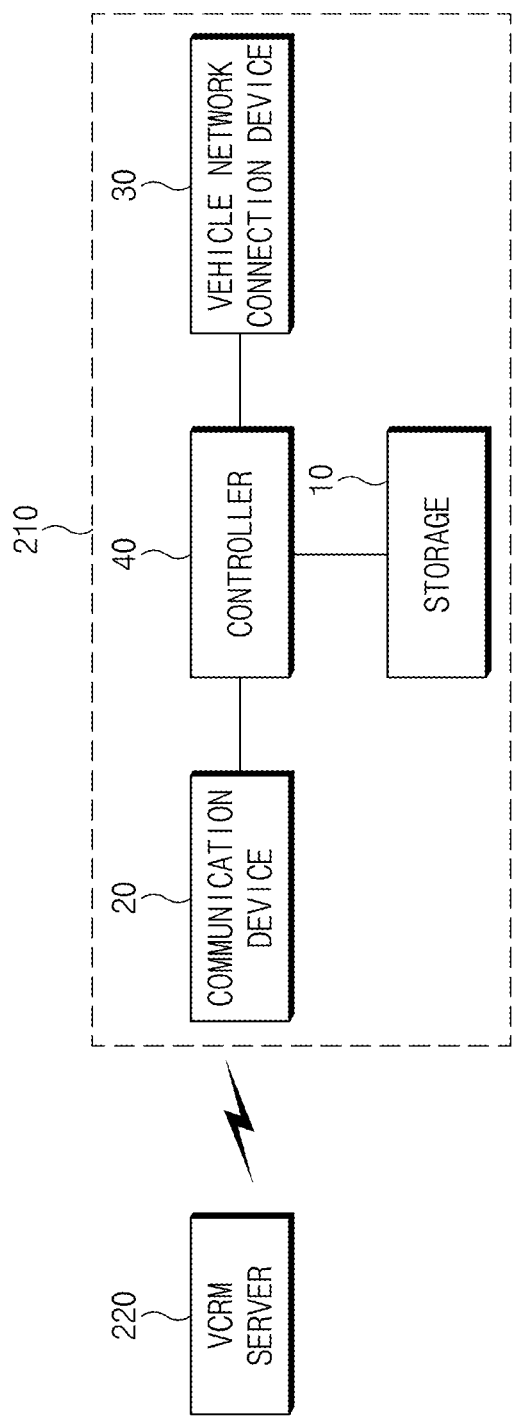
FIG. 2 is a block diagram of a device for controlling a hybrid vehicle according to an exemplary embodiment of the present disclosure.

FIG. 2 is a block diagram of a device for controlling a hybrid vehicle according to an exemplary embodiment of the present disclosure. Although an exemplary embodiment implemented as a separate configuration from the HCU 100 will be described, it may be implemented by being integrated into the HCU 100 as another embodiment.

As shown in FIG. 2, a device 210 for controlling a hybrid vehicle according to an exemplary embodiment of the present disclosure may include storage 10, a communication device 20, a vehicle network connection device 30, and a controller 40. In this case, according to a scheme of implementing the device 210 for controlling a hybrid vehicle according to an exemplary embodiment of the present disclosure, components may be implemented as one while being combined with each other, or some components may be omitted.

Regarding each component, the storage 10 may store various logic, algorithms and programs required in the processes of extracting speeds from the data set including the driving pattern and the control coefficient, learning the control coefficient prediction model by using the average and standard deviation of the speeds and the control coefficient, and determining the control coefficient of the hybrid vehicle based on the control coefficient prediction model which the learning is completed.

The storage 10 may store an exponential moving average calculation algorithm and a moving average calculation algorithm required in the process of determining the control coefficient of the hybrid vehicle based on the control coefficient prediction model for which the learning is completed.

The storage 10 may store the control coefficient prediction model for which the learning is completed.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

The communication device 20, which is a module that provides a communication interface with a vehicle customer relation management (VCRM) server 220, may receive the plurality of data sets that are used to learn the control coefficient prediction model from the VCRM server 220 under control of the controller 40. In this case, each data set includes a driving pattern and a control coefficient corresponding to the driving pattern.

The communication device 20 may include at least one of a mobile communication module, a wireless Internet module, and a short-range communication module to communicate with the VCRM server 220.

The mobile communication module may communicate with the VCRM server 220 through a mobile communication network constructed according to a technical standard or communication scheme for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTLA), and the like).

The wireless Internet module, which is a module for wireless Internet access, may communicate with the VCRM server 220 through wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

The short-range communication module may support short-range communication with the VCRM server 220 by using at least one of Bluetooth™, radio frequency identification (RFID), infrared data association (IrDA), ultra wideband (UWB), ZigBee, near field communication (NFC), and wireless USB technology.

The vehicle network connection device 30, which is a module that provides a connection interface with a vehicle network, may include a controller area network (CAN), a controller area network with flexible data-rate (CAN FD), a local interconnect network (LIN), FlexRay, a media oriented systems transport (MOST), Ethernet, and the like.

The controller 40 may perform the overall control such that each component performs its function. The controller 40 may be implemented in the form of hardware or software or may be implemented in a combination of hardware and software. Preferably, the controller 40 may be implemented as a microprocessor, but is not limited thereto.

Specifically, the controller 40 may perform various controls required in the processes of extracting speeds from the data set including the driving pattern and the control coefficient, learning the control coefficient prediction model by using the average and standard deviation of the speeds and the control coefficient, and determining the control coefficient of the hybrid vehicle based on the control coefficient prediction model which the learning is completed. In this case, one data set may be one learning data, and the controller 40 may learn the control coefficient prediction model based on the plurality of data sets.

In addition, the VCRM server 220 may collect the speed, road slope and brake hydraulic pressure from a first vehicle as driving data. In this case, the driving data, which is data affecting the fuel efficiency of the hybrid vehicle, may include vehicle speed, gradient, brake hydraulic pressure, acceleration, deceleration, road altitude, vehicle weight, and the like. In an exemplary embodiment of the present disclosure, the vehicle speed, the gradient, and the brake hydraulic pressure, which have the greatest influence on fuel efficiency, will be described as examples.

The speed, inclination, and brake hydraulic pressure collected in this manner are continuous values. When each value is defined as a factor determining the driving state of the vehicle, the number representing the driving state of the vehicle exceeds the processing limit. Therefore, by dividing the speed, the gradient, and the brake hydraulic pressure into specified sections and defining the representative values of each section as factors determining the driving state of the vehicle, the driving state of the vehicle may be limited to an optimal number. In this case, it is preferable to determine the minimum and maximum values for the speed, inclination and brake hydraulic pressure, and to determine the specified section at a level at which the distribution characteristic before segmentation is maintained.

For example, the speed may be divided into 130 sections, the gradient may be divided into 20 sections, and the brake hydraulic pressure may be divided into 30 sections. In addition, the representative value of the section including speed '9' is '8', and the representative value of the section including speeds 13, 14 and 15 is '13'. The representative value for the section including slope '−5' may be −5, the representative value for the section including slope '−4.5' may be '−4', and the representative value for the section including brake hydraulic pressure '5.8' may be '5'.

The VCRM server 220 may assign code 'v8s-5b0' to the driving state with speed '8', slope '−5' and brake hydraulic pressure '0' as factors as categorized data. The VCRM server 220 may assign code 'v13s-5b0' to the driving state with speed '13', slope '-5' and brake hydraulic pressure '0' as factors. The VCRM server 220 may assign code 'v13s-4b0' to the driving state with speed '13', slope '-4' and brake hydraulic pressure '0' as factors. The VCRM server 220 may assign code 'v13s-4b5' to the driving state with speed '13', gradient '-4' and brake hydraulic pressure '5' as factors.

The VCRM server 220 may assign code number '1819' to code 'v8s-5b0' as an example and assign code number '1802' to code 'v13s-5b0' as an example. The VCRM server 220 may assign code number '1816' to code 'v13s-4b0' as an example and assign code number '1802' to code 'v13s-4b5' as an example. As another example, the VCRM server 220 may assign code number '0' when the speed is '0', the gradient is '-10', and the brake hydraulic pressure is '0', and assign code number '1' when the speed is '0', the gradient is '-10', and the brake hydraulic pressure is '1'. When the driving state of the vehicle is defined in such a manner, the number of code numbers may be about 8500.

The VCRM server 220 may use the code number of the current time point (t) as the row index and the code number of the next time point (t+1) as the column index, thereby generating transition number matrix that has the number of transitions from the code number of a current time point to the code number of a next time as a value. In this case, the VCRM server 220 may apply the above-described scheme of processing driving data 310 to driving data 320 collected from the second vehicle and driving data 330 collected from the third vehicle and reflect the result in a transition number matrix 340. Through such a process, the number of times of the transition number matrix 340 may be increased. In this case, although three driving data has been described as an example, the number of driving data may be arbitrarily changed according to a designer's intention.

The VCRM server 220 may normalize the transition number matrix 340 to generate a transition probability matrix 350. In the transition probability matrix 350, the sun of each column becomes '1'. The VCRM server 220 may generate a plurality of driving patterns based on the transition probability matrix 350. The driving pattern thus generated is shown in Table 1 below as an example.

TABLE 1

| Time | Code number |
|------|-------------|
| 0    | 120         |
| 1    | 2432        |
| 2    | 1203        |
| ...  | ...         |

Table 1 shows a driving pattern in which code numbers indicating the driving states of a vehicle sequentially transition from 120 to 2432 and then to 1203. By repeatedly performing the process of selecting an initial driving state and determining the next driving state based on probability using the transition probability matrix 350, various driving patterns may be generated for a specified period of time (e.g., 5 minutes). Although the driving pattern is generated based on probability, the driving pattern includes the driving characteristics of a real mad because real road data collected from a plurality of vehicles is used.

Hereinafter, the operation of the controller 40 will be described in detail with reference to FIGS. 3A to 8.

Not all driving patterns received from the VCRM server 220 are valid. Accordingly, a process of selecting an effective driving pattern from among a plurality of driving patterns is accompanied. That is, a process of selecting a data set having an effective driving pattern from among a plurality of data sets including a driving pattern and a control coefficient is accompanied.

FIGS. 3A to 3D are views illustrating an example of a process in which a controller provided in a device for controlling a hybrid vehicle according to an exemplary embodiment of the present disclosure selects an effective driving pattern, Where a process of selecting an effective driving pattern from among a plurality of driving patterns using a beta distribution is shown.

Figure 3A:
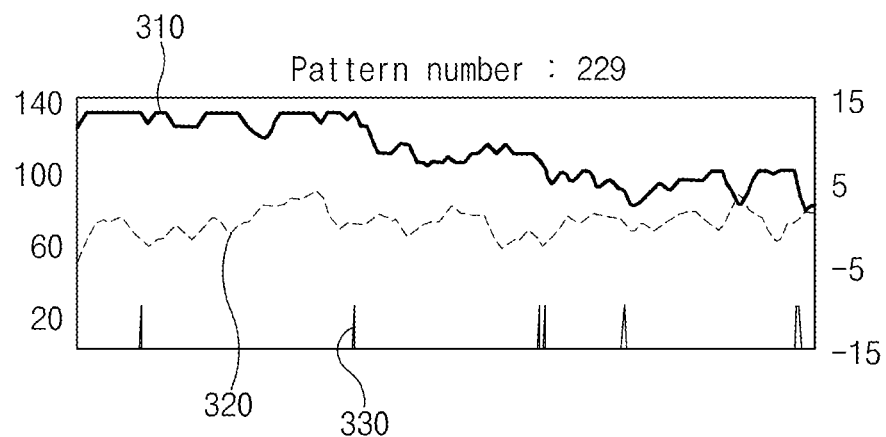
FIGS. 3A to 3D are views illustrating an example of a process in which a controller provided in a device for controlling a hybrid vehicle according to an exemplary embodiment of the present disclosure selects an effective driving pattern.
Figure 3B:
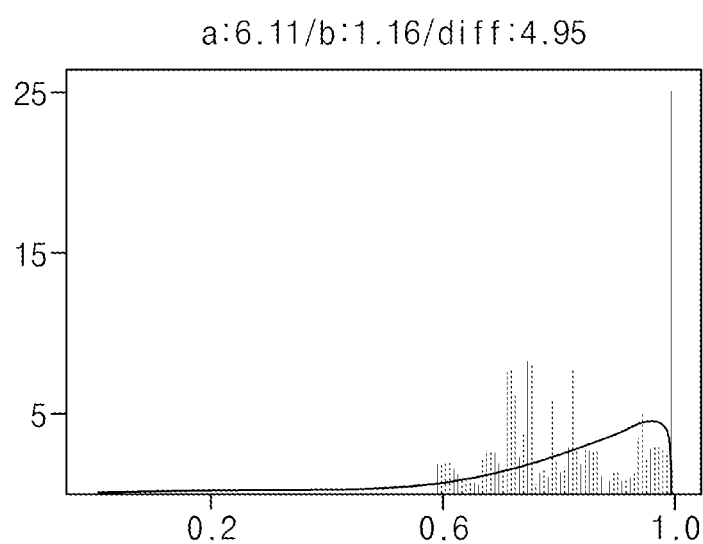
Figure 3C:
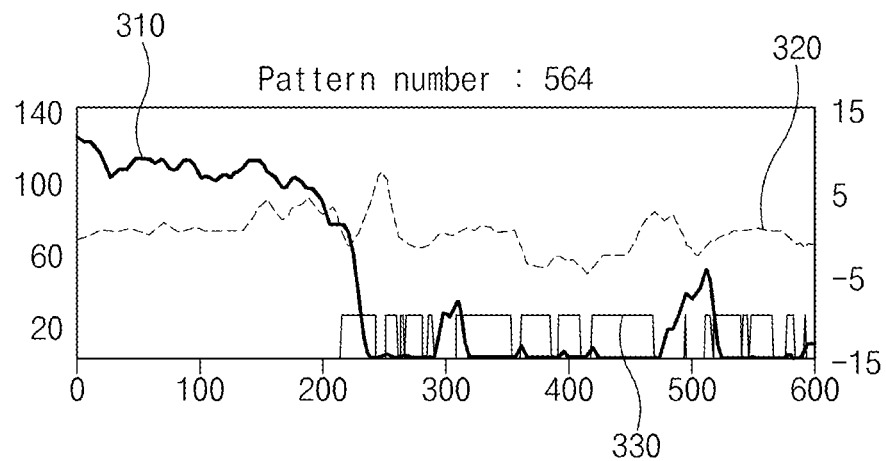

In FIGS. 3A and 3C, reference numeral 310 represents a speed among driving data, reference numeral 320 represents a slope, and reference numeral 330 represents a brake hydraulic pressure. FIG. 3B illustrates a result obtained by applying the beta distribution to the driving pattern of FIG. 3A. The controller 40 may select an effective driving pattern based on values "a" and "b" determined by the average and variance of speeds. In this case, because at least one of the values "a" and "b" exceeds a reference value (e.g., '1'), it is determined as an effective driving pattern.

Figure 3D:
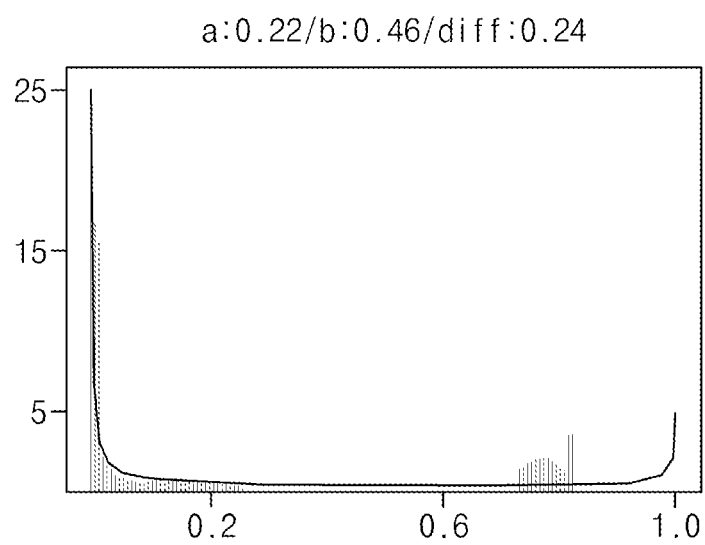

FIG. 3D illustrates a result of applying the beta distribution to the driving pattern of FIG. 3C, and because both values "a" and "b" do not exceed a reference value (e.g., '1'), the controller 40 does not determine it as an effective driving pattern.

Figure 4A:
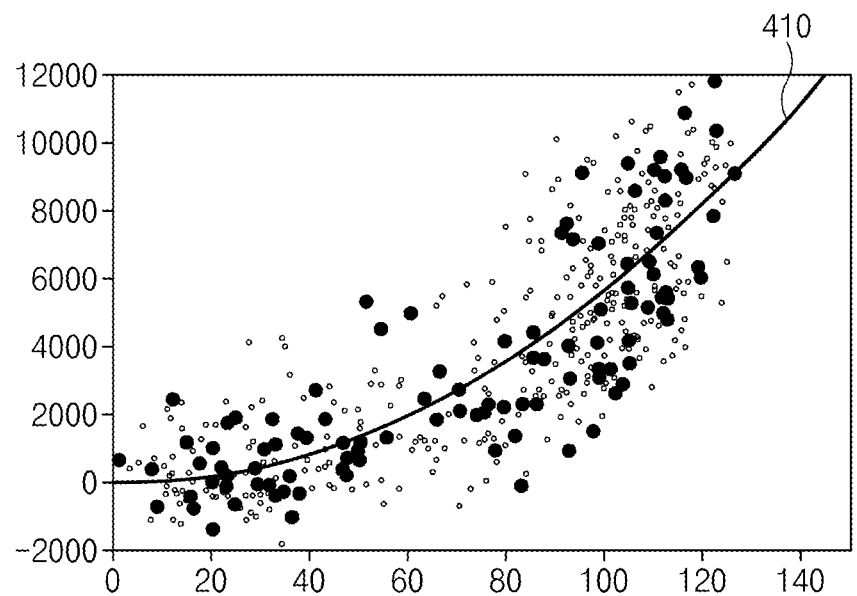
FIGS. 4A and 4B are views illustrating another example of a process in which a controller provided in a control device of a hybrid vehicle according to an exemplary embodiment of the present disclosure selects an effective driving pattern.
Figure 4B:
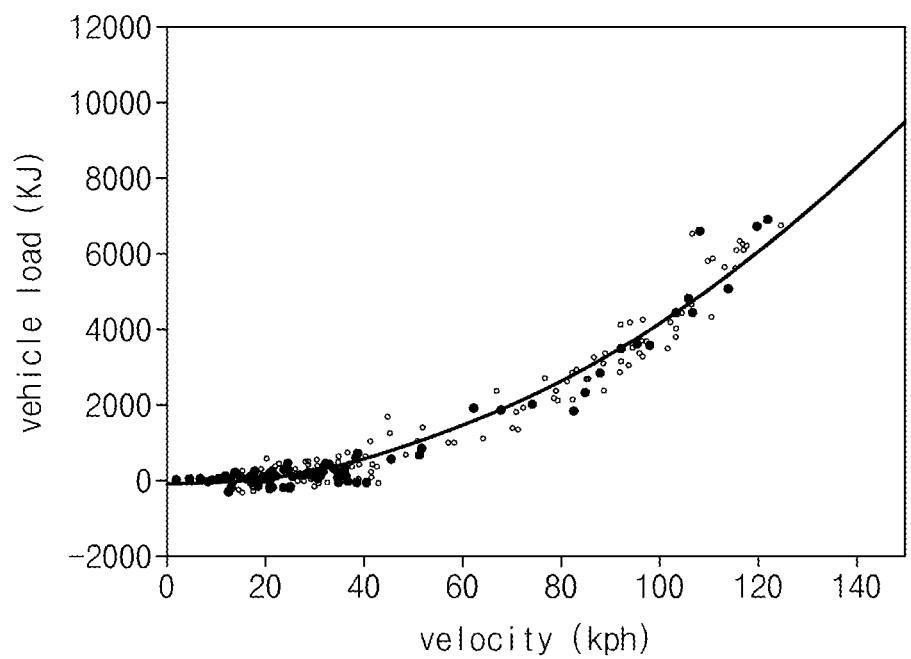

FIGS. 4A and 4B are views illustrating another example of a process in which a controller provided in a control device of a hybrid vehicle according to an exemplary embodiment of the present disclosure selects an effective driving pattern, where a process of selecting an effective driving pattern from among a plurality of driving patterns using 'Kullback-Leiber (KL) divergence'.

FIG. 4A illustrates the distribution of the driving patterns received from the VCRM server 220, where the driving patterns deviating from a reference line 410 by more than a threshold are not valid driving patterns. Accordingly, the controller 40 removes the driving patterns that deviate from the reference line 410 by more than the threshold by using the KL divergence. The result is shown in FIG. 4B.

The controller 40 may extract the speeds from the driving patterns selected through the above-described process. As mentioned above, the driving pattern is a time series combination of driving states defined by driving data (speed, slope and brake pressure). The controller 40 may extract a plurality of speeds from one driving pattern.

The controller 40 may calculate the average and standard deviation of the speeds as learning data for learning the control coefficient prediction model. That is, the controller 40 may calculate the average and standard deviation of each speed for the plurality of driving patterns. In this case, as learning data, the sum of driving loads, driving energy, regenerative energy, the average and standard deviation of speeds, and the like may be extracted from the driving pattern, but when considering the effect on fuel efficiency and multicollinearity, because the average and standard deviation of the speeds are optimal representative factors, it is preferable to select the average and standard deviation of the speeds and the control coefficient as learning data.

The controller 40 may learn the control coefficient prediction model by using the average and standard deviation of the speeds and the control coefficient, and the prediction error of the control coefficient prediction model after learning is completed is about 1%.

Figure 5:
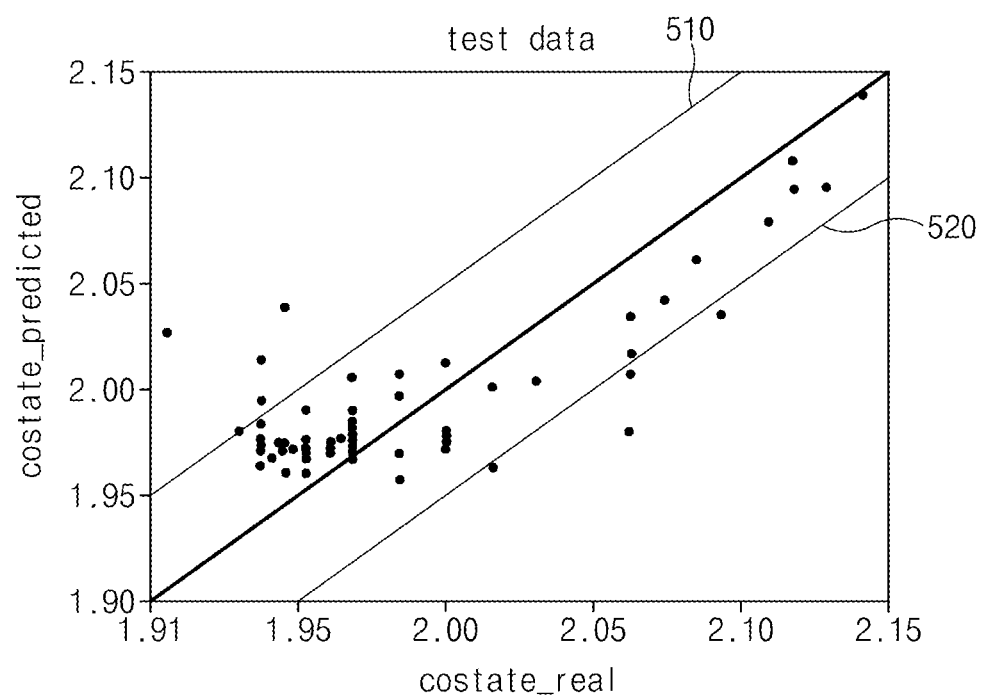
FIG. 5 is a performance analysis diagram of a control coefficient prediction model whose learning is completed by a controller provided in a device for controlling a hybrid vehicle according to an exemplary embodiment of the present disclosure.

FIG. 5 is a performance analysis diagram of a control coefficient prediction model whose learning is completed by a controller provided in a device for controlling a hybrid vehicle according to an exemplary embodiment of the present disclosure.

In FIG. 5, the horizontal axis indicates a real control coefficient (costate_real), and the vertical axis indicates a predicted control coefficient (costate_predicted). Because most of the errors (points) between the real control coefficient and the predicted control coefficient are located between a first reference line 510 and a second reference line 520, and there are only a few points that deviate from it, it is possible to prove the performance of the control coefficient prediction model.

For a driving pattern for a specified period of time (e.g., 5 minutes) so far, the processes in which the controller 40 extracts speeds from the driving pattern and learns the control coefficient prediction model based on the average and standard deviation of the extracted speeds and the control coefficient corresponding to the driving pattern has been described.

In applying the learned control coefficient prediction model to a real hybrid vehicle, the driving time or driving pattern of the hybrid vehicle in a real road environment changes every time. Therefore, in the scheme of predicting the control coefficient in consideration of all the driving states constituting the driving pattern for 5 minutes, due to the time difference between the time of predicting the control coefficient and the time of applying the predicted control coefficient, the coefficient may not be the optimal control coefficient at the time of application.

Accordingly, as shown in FIG. 6, the controller 40 may extract the speeds from the driving states for the reference time (e.g., 90 seconds) among the driving states constituting the driving pattern for 5 minutes, predict the control coefficient (e.g., 2.0) by inputting the average and standard deviation of the speeds to the control coefficient prediction model, and apply the predicted control coefficient to the hybrid vehicle from 120 seconds to 300 seconds. However, in such a scheme, the control coefficient may not be predicted for 120 seconds every 5 minutes.

Accordingly, as shown in FIG. 7, the controller 40 may solve the above-described disadvantages based on multi-processing.

FIG. 7 is a view illustrating a scheme of predicting a control coefficient by a controller provided in a device for controlling a hybrid vehicle according to an exemplary embodiment of the present disclosure.

As shown in FIG. 7, the controller 40 may perform the control coefficient prediction process every 30 seconds. Thus, the controller 40 may not predict the control coefficient only for the first 120 seconds but may continuously predict the control coefficient thereafter.

That is, the control coefficient of 2.0 that can be applied from 120 seconds to 330 seconds is predicted through the first control coefficient prediction, and the control coefficient of 2.1 that may be applied from 150 seconds to 330 seconds is predicted through the second control coefficient prediction after 30 seconds. After 30 seconds again, the control coefficient of 2.2 that may be applied from 180 seconds to 360 seconds is predicted through the third prediction.

When multi-processing is not performed, it may be understood that the control coefficient is not predicted from 330 seconds to 420 seconds as shown in FIG. 7, but when multi-processing is performed, the control coefficient is predicted from 330 seconds to 420 seconds. In this case, several control coefficients are predicted for the same time period, and the scheme of determining the optimal control coefficient among these several control coefficients is shown in FIG. 8.

FIG. 8 is a view illustrating a scheme of determining an optimal control coefficient by a controller provided in a device for controlling a hybrid vehicle according to an exemplary embodiment of the present disclosure.

As shown in FIG. 8, the controller 40 may determine a recently predicted control coefficient as an optimal control coefficient in a first scheme (co-state). For example, after 120 seconds, the first predicted control coefficient may be determined as the optimal control coefficient. After 150 seconds, the second predicted control coefficient may be determined as the optimal control coefficient. After 180 seconds, the third predicted control coefficient may be determined as the optimal control coefficient.

The controller 40 may determine the optimal control coefficient by weighting a recently predicted control coefficient in a second scheme (exponential moving average). The second scheme may prevent the control coefficient from being abruptly changed even when the instantaneous driving pattern of the hybrid vehicle is changed. For example, among the control coefficients 2.0 and 2.1 that can be applied after 150 seconds, a weight (e.g., 0.3) is applied to the recently predicted control efficient of 2.1 to determine the optimal control coefficient as 2.07. The control coefficient of 2.07 determined in such a scheme may be applied between 150 seconds and 180 seconds. As another example, among the control coefficients of 2.0, 2.1 and 2.2 that may be applied after 180 seconds, a weight (e.g., 0.3) may be applied to the recently predicted control coefficient of 2.2 to determine the optimal control coefficient as 2.161. The control coefficient of 2.161 thus determined may be applied to the hybrid vehicle from 180 seconds to 210 seconds.

The controller 40 may determine the average of each control coefficient as an optimal control coefficient in a third scheme (moving average). As an example, '2.05', which is an average of the control coefficients of 2.0 and 2.1 applicable from 150 seconds, may be determined as the optimal control coefficient applicable from 150 seconds to 180 seconds. As another example, '2.1' which is an average of the control coefficients of 2.0, 2.1, and 2.2 applicable from 180 may be determined as the optimal control coefficient applicable from 180 seconds to 210 seconds.

Figure 9:
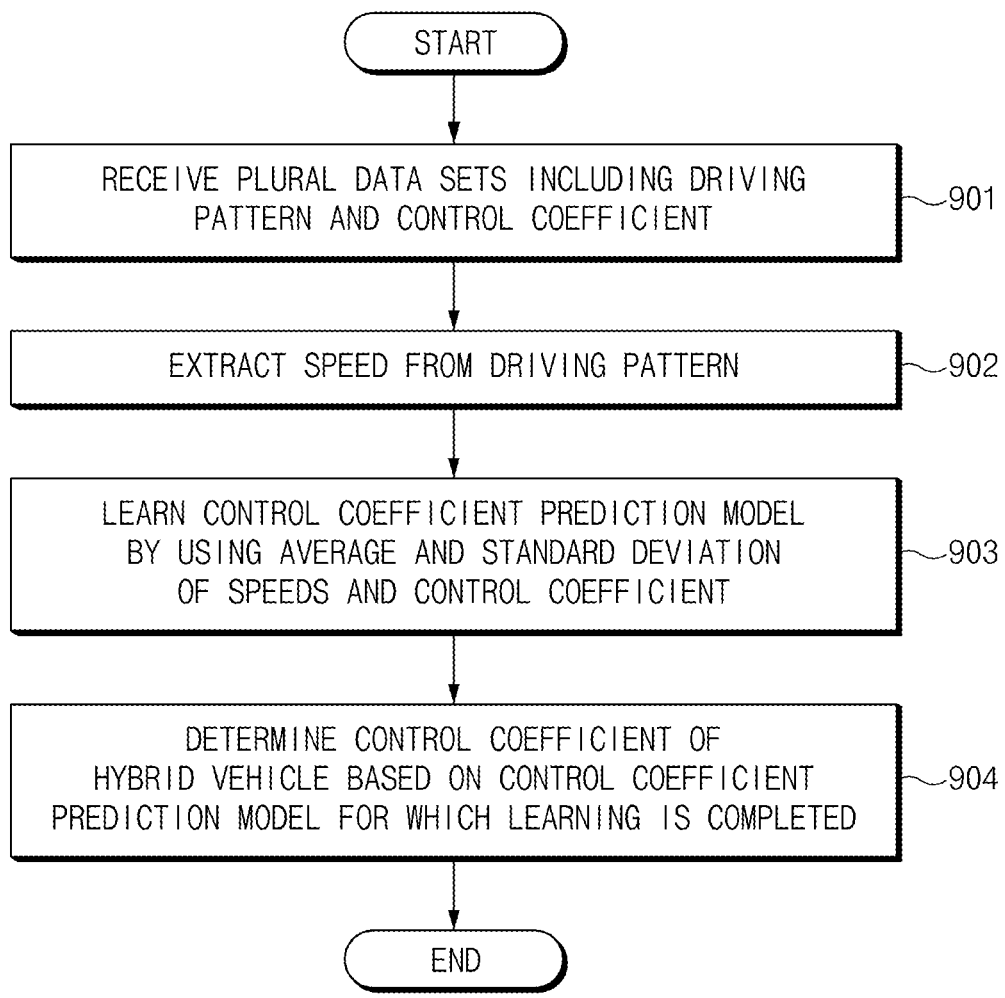
FIG. 9 is a flowchart illustrating a method of controlling a hybrid vehicle according to an exemplary embodiment of the present disclosure.

FIG. 9 is a flowchart illustrating a method of controlling a hybrid vehicle according to an exemplary embodiment of the present disclosure.

First, in 901, the communication device 20 receives the plurality of data sets including a driving pattern and a control coefficient.

Then, in 902, the controller 40 extracts the speeds from the driving pattern.

Then, in 903, the controller 40 learns a control coefficient prediction model by using the average and standard deviation of the speeds and the control coefficient.

Then, in 904, the controller 40 determines the control coefficient of the hybrid vehicle based on the control coefficient prediction model for which the learning is completed.

Figure 10:
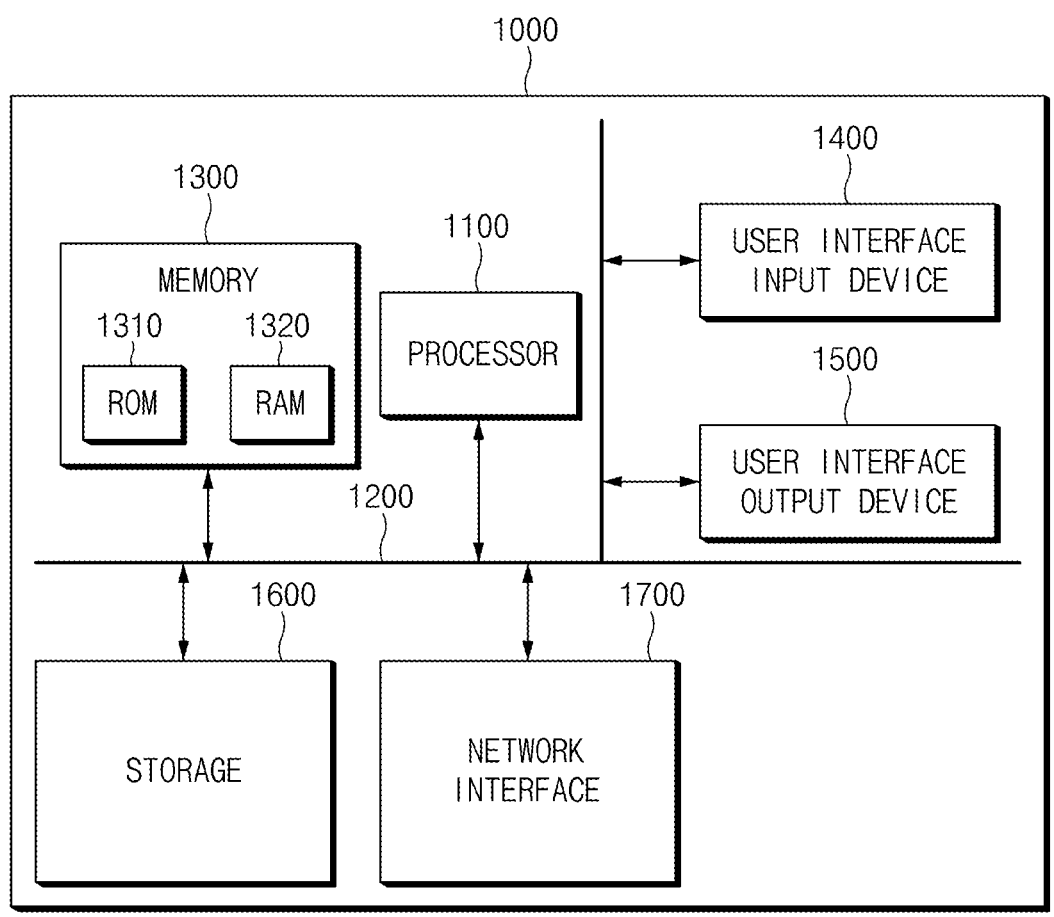
FIG. 10 is a block diagram illustrating a computing system for executing a method of controlling a hybrid vehicle according to an exemplary embodiment of the present disclosure.

FIG. 10 is a block diagram illustrating a computing system for executing a method of controlling a hybrid vehicle according to an exemplary embodiment of the present disclosure.

Referring to FIG. 10, a method of controlling a hybrid vehicle according to an exemplary embodiment of the present disclosure described above may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments of the present disclosure, the device for controlling a hybrid vehicle and the method thereof can minimize electrical energy consumption of the battery and fuel consumption in a rapidly changing driving environment by extracting speeds from a data set including a driving pattern and a control coefficient, learning a control coefficient prediction model by using an average and a standard deviation of the speeds and the control coefficient, and determining the control coefficient of the hybrid vehicle based on the control coefficient prediction model which the learning is completed.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A device for controlling a hybrid vehicle, the device comprising:
   a communication device configured to receive a plurality of data sets comprising a driving pattern and a control coefficient;
   wherein the driving pattern comprises a time series combination of driving states defined based on driving data; and
   wherein the driving data comprises a vehicle speed, a road slope, and a brake hydraulic pressure; and
   a controller configured to:
     extract speeds from the driving pattern,
     learn a control coefficient prediction model by using an average and a standard deviation of the speeds, and
     determine a control coefficient of the hybrid vehicle based on the control coefficient prediction model for which the learning is completed;
     apply the determined control coefficient to the hybrid vehicle; wherein the controller is further configured to:
     extract speeds from some initial driving states among driving states constituting the driving pattern of the hybrid vehicle;
     perform a control coefficient prediction process of inputting the average and the standard deviation of the speeds into the control coefficient prediction model;
     predict a plurality of control coefficients by performing the control coefficient prediction process at a reference time period; and
     determine a recently predicted control coefficient among the plurality of control coefficients as an optimal control coefficient to apply to the hybrid vehicle.

2. The device of claim 1, wherein the controller is further configured to select a data set having an effective driving pattern from among the plurality of data sets.

3. The device of claim 1, wherein the controller is further configured to determine an optimal control coefficient by weighting a recently predicted control coefficient among the plurality of control coefficients.

4. The device of claim 1, wherein the controller is further configured to determine an average of the plurality of control coefficients as an optimal control coefficient.

5. A method of controlling a hybrid vehicle, the method comprising:
   receiving, by a communication device, a plurality of data sets comprising a driving pattern and a control coefficient;
   wherein the driving pattern comprises a time series combination of driving states defined based on driving data; and
   wherein the driving data comprises a vehicle speed, a road slope, and a brake hydraulic pressure;
   extracting, by a controller, speeds from the driving pattern;
   learning, by the controller, a control coefficient prediction model by using an average and a standard deviation of the speeds; and
   determining a control coefficient of the hybrid vehicle based on the control coefficient prediction model for which the learning is completed; and
   applying the determined control coefficient to the hybrid vehicle;
   wherein the determining of the control coefficient of the hybrid vehicle comprises:
     operation A of extracting speeds from some initial driving states among driving states constituting the driving pattern of the hybrid vehicle; and
     operation B of inputting the average and the standard deviation of the speeds into the control coefficient prediction model to predict a control coefficient;
     predicting a plurality of control coefficients by performing the operation A and the operation B at a reference time period; and
     determining a recently predicted control coefficient among the plurality of control coefficients as an optimal control coefficient to apply to the hybrid vehicle.

6. The method of claim 5, further comprising:
selecting, by the controller, a data set having an effective driving pattern from among the plurality of data sets.

7. The method of claim 5, wherein the determining of the control coefficient of the hybrid vehicle comprises:
determining an optimal control coefficient by weighting a recently predicted control coefficient among the plurality of control coefficients.

8. The method of claim 5, wherein the determining of the control coefficient of the hybrid vehicle comprises:
determining an average of the plurality of control coefficients as an optimal control coefficient.

* * * * *